(12) United States Patent
Goode et al.

(10) Patent No.: US 8,101,691 B2
(45) Date of Patent: Jan. 24, 2012

(54) SYSTEMS AND METHODS FOR FABRICATING POLYMERS

(75) Inventors: Mark G. Goode, Hurricane, WV (US);
Maria Pollard, Pearland, TX (US);
Kevin J. Cann, Rocky Hill, NJ (US);
Ronald S. Eisinger, Charleston, WV (US); Barbara J. Kopp, Kinnelon, NJ (US); John H. Moorhouse, Kendall Park, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/128,160

(22) PCT Filed: Dec. 17, 2009

(86) PCT No.: PCT/US2009/068438
§ 371 (c)(1),
(2), (4) Date: May 6, 2011

(87) PCT Pub. No.: WO2010/075160
PCT Pub. Date: Jul. 1, 2010

(65) Prior Publication Data
US 2011/0237763 A1     Sep. 29, 2011

Related U.S. Application Data

(60) Provisional application No. 61/203,390, filed on Dec. 22, 2008.

(51) Int. Cl.
*C08F 2/38* (2006.01)
*C08F 2/34* (2006.01)
*B01J 19/24* (2006.01)
*C08F 4/602* (2006.01)

(52) U.S. Cl. ............ 526/60; 526/59; 526/105; 526/905; 422/131

(58) Field of Classification Search .............. 526/59, 526/60, 905, 105; 422/131
See application file for complete search history.

(56) References Cited

U.S. PATENT DOCUMENTS

| 3,709,853 | A | 1/1973 | Karapinka |
| 5,408,015 | A | 4/1995 | Hsieh et al. |
| 5,473,027 | A | 12/1995 | Batchelor et al. |

FOREIGN PATENT DOCUMENTS

| EP | 0307907 A2 | 3/1989 |
| EP | 0905147 A1 | 3/1999 |
| GB | 971998 | 10/1964 |
| WO | WO 2005/108439 A2 | 11/2005 |
| WO | WO 2008/045171 A2 | 4/2008 |

*Primary Examiner* — Fred M Teskin (57) ABSTRACT

Disclosed herein are various methods and systems for gas and liquid phase polymer production. In certain embodiments, the methods comprise manipulating properties of polymers produced by adjusting the hydrogen feed rate.

16 Claims, 5 Drawing Sheets

SYSTEMS AND METHODS FOR FABRICATING POLYMERS

CROSS REFERENCE TO RELATED APPLICATIONS

This application is a National Stage application under 35 U.S.C. §371 of International Application No. PCT/US2009/068438, filed Dec. 17, 2009, that claims the benefit of U.S. provisional application Ser. No. 61/203,390 filed on Dec. 22, 2008, the disclosures of which is incorporated by reference in its entirety.

FIELD OF THE INVENTION

This disclosure relates to polymer production, and more particularly to systems and methods for controlling properties of polymers produced in gas phase and liquid phase processes.

BACKGROUND

In the gas phase process for production of polyolefins such as polyethylene, a gaseous alkene (e.g., ethylene), hydrogen, co-monomer and other raw materials are converted to solid polyolefin product. Generally, gas phase reactors include a fluidized bed reactor, a compressor, and a cooler (heat exchanger). The reaction is maintained in a two-phase fluidized bed of granular polyethylene and gaseous reactants by the fluidizing gas which is passed through a distributor plate near the bottom of the reactor vessel. Catalyst is added to the fluidized bed. Heat of reaction is transferred to the circulating gas stream. This gas stream is compressed and cooled in the external recycle line and then is reintroduced into the bottom of the reactor where it passes through a distributor plate. Make-up feedstreams are added to maintain the desired reactant concentrations.

The properties of the polymer formed by such a process can be controlled to some extent by varying the operating conditions, including the operating temperature, comonomer amount, and type and quantity of catalyst. Such properties include the molecular weight of the polymer product, the molecular weight distribution of the polymer product, polymer density, and the flow index of the polymer product.

The properties of the polymer product as extracted from the reactor system, as well as in processed form for sale to customers, is also important. Typically, polymer product is extracted from the reactor and extruded into a more manageable form, such as pellets or bars. The flow index of a polymer product produced by a gas phase process using Cr based catalysts, including those containing an aluminum alkyl such as diethyl aluminum ethoxide (DEALE), tend to show a decrease or otherwise downward shift in the flow index (a net increase in molecular weight) when passed through an extrusion line, as compared to the flow index of granular resin taken directly from the reactor. This difference in flow index between the extruded material and the raw product, or flow index "shift", is typically small, amounting to only a few units, e.g., <2 dg/min, for Cr-based catalysts. However, for some processes, the flow index shift is high, such that control of the polymer properties may be lost, as well as the possibility that the properties of the polymer itself are changed or sacrificed due to chain scission and/or recombination and cross linking. Therefore, it would be desirable to control the flow index shift to some extent.

In some cases it is also found that the flow index of polymer particles of different size fractions vary substantially. When this variation is very large, it is difficult to obtain reliable flow index data for the bulk material.

SUMMARY

Disclosed herein are various methods and systems for gas phase polymer production, including the production of polyolefins such as polyethylene. The method may include introducing a chromium-based catalyst to a gas phase reactor system; contacting a gaseous monomer and, optionally, one or more comonomers with the catalyst in the reactor system to form a polymer; extracting the polymer from the reactor system, wherein the extracted polymer has a first flow index; processing the extracted polymer, wherein the processed polymer has a second flow index; determining the flow index shift, wherein the flow index shift is the difference between the second flow index and the first flow index; wherein the amount of hydrogen introduced into the reactor is adjusted to manipulate the flow index shift. In some embodiments, the chromium-based catalyst is a chromium oxide-based catalyst that has been reduced with diethylaluminum ethoxide (DEALE).

Also disclosed herein is a method for producing a polymer that includes selecting a chromium oxide based catalyst that has been reduced with diethyl aluminum ethoxide (DEALE) that produces a polymer product having about a desired product flow index at selected reaction conditions; adding the catalyst to a polymerization system; adding hydrogen and ethylene to the polymerization system at a hydrogen/ethylene gas mole ratio of about 0.01 or less; and contacting the ethylene with the catalyst for producing a granular polymer having about a same flow index as a pelletized polymer formed from the granular polymer. In some embodiments, the difference between the flow index of the pelletized polymer and the flow index of the granular polymer is less than or equal to ±0.2 dg/min.

Also disclosed herein is a polymerization reactor system that includes a reactor vessel; a mechanism for adding a chromium-based catalyst to the reactor vessel; a mechanism for adding a monomer and optional comonomers to the reactor system, the monomer and optional comonomers contacting the catalyst in the reactor system and forming a polymer; a mechanism for extracting the polymer from the reactor system, the extracted polymer having a first flow index, the extracted polymer having a second flow index upon further processing; and a mechanism for adding hydrogen to the reactor system at a rate selected to have a defined effect on a flow index shift, where the flow index shift is the difference between the second flow index and the first flow index.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, catalyst structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

It has surprisingly been found that, for a polymer formed in a gas phase process using a Cr based catalyst, the flow index shift, or the flow index of the extruded polymer minus the flow index of the raw polymer product as taken from the reactor system, can be adjusted by controlling the amount of hydrogen added to the reactor system. For instance, the flow index shift can be made to go from negative to positive by reducing the amount of hydrogen added to the reactor system. The flow index shift may even be tuned to zero by controlling the amount of hydrogen added to the reactor system.

Figure 1:
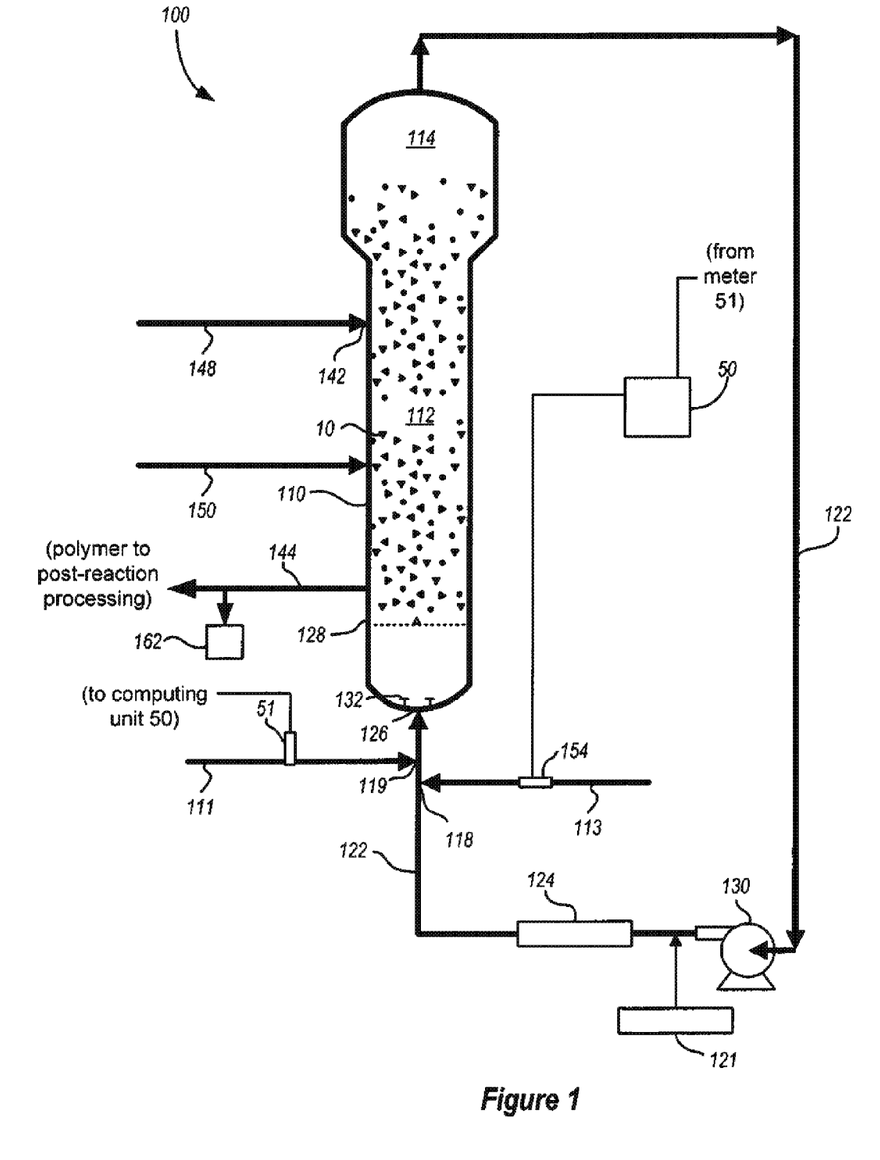
FIG. 1 is a schematic representation illustrating implementation of certain embodiments in a gas phase polymerization reactor system.

A general method of the invention can be described, for example, with reference to FIG. 1, in which a bulk material 10 is present in a gas phase polymerization reactor system 100. A chromium-based catalyst is added to the gas phase reactor system 100 via an appropriate mechanism such as feed line 148. A gaseous monomer, and optional comonomers, added to the system via an appropriate mechanism such as feed line 111, is/are contacted with the catalyst in the reactor system 100 for polymerizing the monomer to form a polymer. The polymer is extracted from the reactor system 100 via an appropriate mechanism such as product discharge line 144, the extracted polymer having a first flow index, the extracted polymer having a second flow index upon further processing. Hydrogen is added to the reactor system via an appropriate mechanism such as feed line 113 in order to manipulate a flow index shift, where the flow index shift is the difference between the second flow index and the first flow index. For example, the hydrogen can be added at a rate selected to have a defined effect on the flow index shift.

In another preferred general approach of the general method described, for example, with reference to FIG. 1, a method for producing a polymer includes injecting a chromium oxide-based catalyst that has been reduced with DEALE into a gas phase reactor system 100. A gaseous monomer is contacted with the catalyst in the reactor system for polymerizing the monomer to form a polymer. The polymer is extracted from the reactor system, the extracted polymer having a first flow index. The first flow index of the extracted polymer is measured such as by an indexer 162. The extracted polymer is processed, the processed polymer having a second flow index. The second flow index of the processed polymer is measured, optionally using the same indexer. A flow index shift is determined, where the flow index shift is a difference between the second flow index and the first flow index. Hydrogen is added to the reactor system for manipulating the flow index shift, a feed rate of the hydrogen being selected based on the determined flow index shift.

Further details of fluidized bed and other gas phase polymerization reactor systems including specific materials used in the fabrication are described below, and each of the below-described details are specifically considered in various combinations with these and other generally preferred approaches described herein.

The present invention also includes devices and systems effective for producing polyolefins according to the aforementioned methods. In general, such devices are systems or apparatus that comprise one or more mechanisms for feeding hydrogen into a polymerization reactor system.

For ease of understanding of the reader, as well as to place the various embodiments of the invention in a context, much of the following description shall be presented in terms of a commercial, gas phase polyethylene reactor system. It should be kept in mind that this is done by way of non-limiting example only.

Hydrogen Effect on Flow Index Shift

Typically, properties such as flow index, melt index, toughness, etc. of a polymer are prespecified. Then, the catalyst and reaction conditions necessary to create a polymer having the specified properties are selected and applied to a polymerization reaction. The resulting polymer will typically have about the desired properties. However, upon further processing, such as extrusion, pelletizing, etc., the properties of the polymer may change, possibly to an extent that the polymer is no longer suitable for its intended purpose.

One measure of the aforementioned change in properties is the flow index shift. The flow index shift of a polymer is defined as the flow index of a processed (e.g., extruded, pelletized, etc.) polymer product minus the flow index of granular resin taken directly from the reactor system.

It has surprisingly been discovered that the flow index shift can be manipulated and maintained by varying the feed rate of hydrogen to an ongoing gas phase polymerization reaction. For raw and extruded polyethylene, for example, the flow index shift can be changed to a negative value or a positive value by introducing more or less hydrogen to the reactor system, respectively. The flow index shift can even be tuned to about zero.

Hydrogen may also control and affect the swell and Environmental Stress Crack Resistance (ESCR) of the produced polymer. Accordingly, one practicing the invention may wish to select a catalyst and reaction temperature that produces a polymer having the desired swell and flow index. Hydrogen can then be used independently, or in conjunction with other considerations, to tune the flow index shift to zero or some desired positive or negative value. For example, where a chromium-based catalyst that has been reduced with DEALE is used, the amount of hydrogen added may be selected in light of the expected or actual effect of the DEALE/Cr ratio of the catalyst on the reaction.

The effect of hydrogen on the flow index shift does not appear to be linear over a broad range. Rather, at least for polyethylene produced with a DEALE reduced chromium oxide-based (CrOx) catalyst and extruded into pellets, the change from positive to no flow index shift occurs at a very low hydrogen/ethylene (H2/C2) ratio, e.g., about 0.01 (0.01±0.01), more preferably about 0.01±0.005 mol/mol, above which the flow index shift increases less.

Thus, in one approach, a method for producing a polymer includes selecting a chromium oxide based catalyst that has been reduced with diethyl aluminum ethoxide (DEALE) that produces a polymer product having about a desired product flow index at selected reaction conditions while at a hydrogen/ethylene gas mole ratio of about 0.01, and adding the catalyst to a polymerization system. Hydrogen and ethylene are also added to the polymerization system at a hydrogen/ethylene gas mole ratio of about 0.01 or less, e.g., in a range of about 0 to about 0.01. The ethylene is contacted with the catalyst for producing a granular polymer having about a same flow index as a pelletized polymer formed from the granular polymer so produced. As an option, oxygen addition may be used to manipulate the flow index of the granular polymer to a desired range while maintaining the hydrogen/ ethylene gas mole ratio in the desired range. Moreover, the foregoing approach may allow selection of, and operation at, a reaction temperature that achieves about a maximum polymer production rate for the polymerization system, thereby maximizing production while maintaining a low flow index shift.

Several advantages that may be achieved by various approaches of the present invention include improved process control, reduced off-grade and improved product performance, etc.

Reactor Systems and Reaction Processes

The inventive concepts described herein are applicable to polymerizations by any suspension, solution, slurry, or gas phase process, using known equipment and reaction conditions, and is not limited to any specific type of polymerization system. Thus, while various embodiments of the present invention are described in relation to gas phase polyolefin production, the broad concepts and teachings herein may also have applicability to many types of processes, including but not limited to, gas phase, gas/solid phase, liquid/solid phase, gas/liquid phase, and gas/liquid/solid phase reactor systems including polymerization reactor systems; gas phase, gas/ solid phase, liquid/solid phase, gas/liquid phase, and gas/ liquid/solid phase mass transfer systems; gas phase, gas/solid phase, liquid/solid phase, gas/liquid phase, and gas/liquid/ solid phase mixing systems; etc.

The polymerization system may comprise a single reactor or two or more reactors in series, and polymerization is preferably conducted substantially in the absence of catalyst poisons. Organometallic compounds may be employed as scavenging agents for poisons to increase the catalyst activity. Examples of scavenging agents are metal alkyls, preferably aluminum alkyls. They may be fed in liquid form, in liquid mixtures, or supported first on a solid support such as porous silica.

Fluidized Bed Polymerization Reactor Systems

In each of the aforementioned generally preferred approaches and/or embodiments, a fluidized bed system can include a fluidized bed polymerization reactor system. As briefly noted above, gas phase polymerization reactions may be carried out in fluidized bed polymerization reactors, and can also be carried out in stirred or paddle-type reactor systems (e.g., stirred bed systems) which include solids in a gaseous environment. While the following discussion will feature fluidized bed systems, where the present invention has been found to be preferred and especially advantageous, it is to be understood that the general concepts relating to the addition of hydrogen to control the flow index shift, which are discussed as being relevant to the preferred fluidized bed systems, are also adaptable to the stirred or paddle-type reactor systems as well. The present invention is not limited to any specific type of gas phase reactor system.

The fluidized bed is generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc.

Fluidized beds can also be formed by vibrating or otherwise agitating the particles. The vibration or agitation keeps the particles in a fluidized state.

In general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer and optional comonomers are added to the system, e.g., into the recycle stream or reactor vessel, to replace the polymerized monomer. See U.S. Pat. Nos. 4,543,399, 4,588, 790, 5,028,670, 5,317,036, 5,352,749, 5,405,922, 5,436,304, 5,453,471, 5,462,999, 5,616,661, 5,668,228, and 6,689,847. A basic, conventional fluidized bed system is illustrated in FIG. 1. The reactor vessel 110 comprises a reaction zone 112 and a velocity reduction zone 114. While a reactor configuration comprising a generally cylindrical region beneath an expanded section is shown in FIG. 1, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 1.

In general, the height to diameter ratio of the reaction zone can vary in the range of about 2.7:1 to about 5:1. The range may vary to larger or smaller ratios and depends mainly upon the desired production capacity. The cross-sectional area of the velocity reduction zone 114 is typically within the range of from about 2.5 to about 2.9 multiplied by the cross-sectional area of the reaction zone 112.

The reaction zone 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec. for polyolefins. Preferably, the superficial gas velocity is at least 0.2 ft/sec above the minimum flow for fluidization or from about 0.4 to about 0.7 ft/sec. Ordinarily, the superficial gas velocity will not exceed 5.0 ft/sec and is usually no more than about 2.5 ft/sec.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area.

Referring again to FIG. 1, make-up fluids can be fed at points 118 and 119 via recycle line 122. The composition of the recycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the recycle stream and, where desired, at least part of the make-up stream can be returned through recycle line 122 to the reactor, for example at inlet 126 below the bed. Preferably, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover.

The recycle stream is then compressed in compressor 130 and passed through heat exchanger 124 where the heat of reaction is removed from the recycle stream before it is returned to the bed. Note that the heat exchanger 124 can also be positioned before the compressor 130. An illustrative heat exchanger 124 is a shell and tube heat exchanger, with the recycle gas traveling through the tubes.

The recycle stream exiting the heat exchange zone is then returned to the reactor at its base 126 and thence to the fluidized bed through gas distributor plate 128. A fluid flow deflector 132 is preferably installed at the inlet to the reactor to prevent contained polymer particles from settling out and agglomerating into a solid mass and to maintain entrained or to re-entrain any particles or liquid which may settle out or become disentrained.

In this embodiment, polymer product is discharged from line 144. Although not shown, it is desirable to separate any fluid from the product and to return the fluid to the reactor vessel 110.

In accordance with an embodiment of the present invention, the polymerization catalyst enters the reactor in solid or liquid form at a point 142 through line 148. If one or more co-catalysts are to be added, the one or more cocatalysts may be introduced separately into the reaction zone through line 150 where they will react with the catalyst to form the catalytically active reaction product and/or affect the reaction proceeding in the reactor system. However the catalyst and cocatalyst(s) may be mixed prior to their introduction into the reaction zone.

The reactor shown in FIG. 1 is particularly useful for forming polyolefins such as polyethylene, polypropylene, etc. Process conditions, raw materials, catalysts, etc. for forming various polyolefins and other reaction products are found in the references incorporated herein. Illustrative process conditions for polymerization reactions in general are listed below to provide general guidance.

The reaction vessel, for example, has an inner diameter of at least about 14 inches, and is generally greater than about 10 feet, and can exceed 15 or 17 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. In one approach, the reactor temperature is less than about 40° C., or less than about 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 125° C. to 130° C.

The overall temperature in a gas phase process typically varies from about 30° C. to about 120° C. In one approach, the temperature at the point of highest temperature in the reactor system is less than about 30° C., more preferably less than about 20° C., and even more preferably less than about 15° C. below the melting point of the polyolefin being produced. In a system such as that shown in FIG. 1, the point of highest temperature is typically at the outlet of the compressor 130.

Other gas phase processes contemplated include series or multistage polymerization processes. Also contemplated are gas phase processes described in U.S. Pat. Nos. 5,627,242, 5,665,818 and 5,677,375, and European publications EP-A-0 794 200, EP-B1-0 649 992, EP-A-0 802 202, and EP-B-634 421.

In any of the embodiments described herein, the gas phase process may be operated in a condensed mode, where an inert condensable fluid is introduced to the process to increase the cooling capacity of the reactor system. These inert condensable fluids are referred to as induced condensing agents or ICA's. For further details of a condensed mode processes see U.S. Pat. Nos. 5,342,749 and 5,436,304.

In an embodiment, the reactor utilized in the present invention is capable of producing greater than 500 lbs of polymer per hour (227 Kg/hr) to about 300,000 lbs/hr (136,100 Kg/hr) or higher of polymer, preferably greater than 1000 lbs/hr (454 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,500 Kg/hr) to greater than 100,000 lbs/hr (45,400 Kg/hr).

Another illustrative fluidized bed polymerization reactor system is a recirculating system that includes a fast riser, a downcomer, and a recirculating pump. In this type of system, the polymerization product is formed primarily in the fast riser, but continues to form throughout the system. Polymer particles formed in the fast riser may pass through a line to an upper inlet port of the downcomer. The polymer particles gather in the downcomer, where they move downwardly in a dense, slow moving bed. The bed formed in the downcomer can be considered a fluidized bed.

Other Types of Bed Systems

Slower moving masses of particles, while considered "fluidized" for purposes herein, are also referred to in the art as "moving beds." Moving beds include particles in such things as mass flow bins, downcomers, etc. where solids are slowly moving through a vessel.

Stirred bed systems, while considered "fluidized" for purposes herein, include beds stirred or otherwise agitated by a member such as a paddle or plunger rotating or moving through the bed (e.g., stirred bed reactor, blender, etc.). Other types of stirred bed systems can be formed by a rotating drum (e.g., with or without internal baffles to enhance mixing), a vessel moving in a see-saw manner, agitation including ultrasonic vibrations applied to the particles or their container, etc.

The methods disclosed herein may be useful in a liquid phase polymerization system, such as a slurry, suspension or solution reactor system. The liquid phase polymerization system may generally comprises a reactor vessel to which an olefin monomer and a catalyst composition are added, either individually or as a mixture combined prior to addition to the reactor vessel. The reactor vessel typically contains a liquid reaction medium for dissolving and/or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization, Among the inert liquid hydrocarbons suitable for this purpose are isobutane, isopentane, hexane, cyclohexane, heptane, benzene, toluene, and the like. Slurry or solution polymerization systems may utilize subatmospheric or superatmospheric pressures and temperatures in the range of about 40° C. to about 300° C. A useful liquid phase polymerization system is described in U.S. Pat. No. 3,324,095.

Fluids

The reactor systems and methods described herein can be used in connection with liquids and/or gases having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.0005 g/cc^3 to about 20 g/cc^3 and/or can have a dielectric constant ranging from about 1 to about 100. In many embodiments, the bulk material is a gaseous fluid. Gaseous fluids can, for example, generally have viscosities ranging from about 0.001 to about 0.1 cP, and/or can have densities ranging from about 0.0005 to about 0.1 g/cc^3 and/or can have a dielectric constant ranging from about 1 to about 1.1.

The bulk material can include relatively pure gaseous elements (e.g., gaseous $N_2$, gaseous $H_2$, gaseous $O_2$). Other components can include relatively pure liquid, solid, or gaseous compounds (e.g., liquid or solid catalyst, gaseous monomers). The various systems can also include single-phase or multi-phase mixtures of gases, solids and/or liquids, including for example: two-phase mixtures of solids and gases (e.g., fluidized bed systems), mixtures of gases with a single type of particle, mixtures of gases with different types of particles (e.g., polymer and catalyst particles); and/or three-phase mixtures of gases, liquids and solids (e.g., fluidized bed with liquid catalyst being added or liquid monomer or other liquid compound). Particular examples of preferred fluids are described herein, including in discussion below regarding preferred applications of the methods and devices of the invention.

Hydrogen

In some embodiments, the amount of hydrogen fed to the reactor system maintains in the fluidized bed reactor system a molar ratio of hydrogen to monomer in the range of about 0 and about 0.5 mol/mol. In other embodiments, hydrogen is fed to the reactor system to maintain in the fluidized bed reactor system a molar ratio of hydrogen to monomer in the range of about 0 and about 0.25 mol/mol, between 0 and about 0.1 mol/mol, and in the range of 0 and about 0.05 mol/mol. In preferred embodiments, the hydrogen is fed to the reactor system to maintain in the fluidized bed reactor system a molar ratio of hydrogen to monomer in the range of about zero and about 0.01 mol/mol. In some embodiments, hydrogen is introduced to the reactor system at a rate sufficient to maintain in the reactor system a molar ratio of hydrogen to monomer in the range of 0.0001 to 0.01 mol/mol, or in the range of 0.005 to 0.01 mol/mol, or in the range of 0.01 to 0.01 mol/mol.

The feed rate of the hydrogen may be set to about a predetermined molar ratio of a feed rate of a monomer. For example, the feed rate of the hydrogen may be fixed, or may vary with the feed rate of the monomer to maintain the predetermined ratio of feed rate of the hydrogen to the feed rate of the monomer.

In one approach, hydrogen may be added at a rate that maintains the flow index shift equal to about zero. This typically entails feed of some hydrogen to the reactor system, but may include a feed rate of hydrogen of zero at some times.

In other approaches, hydrogen may be added at a rate that maintains a positive or a negative flow index shift. In some embodiments, the hydrogen may be added at a rate that maintains the flow index shift less than or equal to about 2 dg/min, or less than or equal to about 1 dg/min, or less than or equal to about 0.5 dg/min, or less than or equal to about 0.2 dg/min.

In some embodiments, the absolute value of the flow index shift is less than or equal to about 2 dg/min, or less than or equal to about 1 dg/min, or less than or equal to about 0.5 dg/min, or less than or equal to about 0.2 dg/min.

In preferred approaches, the amount of hydrogen added is small enough to have negligible effect on catalyst productivity.

Those skilled in the art will appreciate that the reaction process, while typically being very stable, may vary from time to time as a result of various factors including presence of impurities, fouling, variations in feed rates of other components, etc. To verify that the flow index shift is being maintained at about the desired value, the flow index shift can be monitored and adjustments to the feed rate of the hydrogen made. In one approach, the flow index of a sample of the polymer as extracted from the reactor system, and the flow index of a sample of the processed polymer, may be measured and used to determine the flow index shift. Any adjustments to the flow rate of the hydrogen can be made based on the flow index shift. For instance, if the negative flow index shift is less than desired, the feed rate of the hydrogen can be increased. Conversely, if the negative flow index shift is more than desired, the feed rate of the hydrogen can be decreased. In preferred embodiments, the flow index shift is periodically determined and the hydrogen feed rate adjusted. The period may be any suitable period, including hourly, several times per day, daily, etc. The period may also be irregular.

Catalysts

Useful catalysts and catalyst systems include chromium-based catalysts, chromium oxide-based catalysts, and reduced chromium oxide-based catalysts.

It is desired that any such catalytic system perform well during high space-time yield operation (i.e., operation maximizing polymer produced per unit reactor time and reactor space), producing the greatest amount of polyethylene possible with high catalyst activity in a shorter residence time. Chromium oxide catalysts possess adequate productivity and activity, yet polyethylenes produced through their use are less than optimal for a number of applications where high molecular weight, broad molecular weight distribution, and optionally the presence of some degree of bimodality of molecular weight distribution are desired.

A chromium oxide-based catalyst reduced with a reducing agent will have certain properties based on the ratio of reducing agent to chromium. The stated equivalents noted herein are always the ratio of reagent to chromium. In a preferred embodiment, a chromium oxide-based catalyst used for polyolefin, e.g., polyethylene, applications includes a silica supported chromium oxide reacted subsequently reduced with DEALE. This type of catalyst provides a polyethylene with a broad molecular weight distribution.

In general, CrOx catalyst reduced with DEALE is used to fabricate broad molecular weight distribution polyethylene. Thus, the DEALE/Cr ratio of the catalyst in conjunction with the polymerization operating conditions define the product characteristics and production rate.

Information about these and other types of catalysts as well as characteristics of the polymer products formed is found in U.S. Pat. No. 6,989,344. Several methods of preparation for chromium oxide-based catalysts are disclosed in U.S. Pat. No. 6,989,344, which is herein incorporated by reference.

Operating Conditions

The operating conditions of the reactor and other systems are not narrowly critical to the invention in some embodiments. While general operating conditions have been provided above for fluidized bed polymerization reactor systems, fluidized and nonfluidized bed systems can, in addition to those listed above, have widely varying process conditions, such as temperature, pressure, fluid flowrate, etc.

The operating conditions of the reactor and other systems are critical to the invention in other embodiments. For example, higher operating temperatures generally result in a higher production rate. Therefore, an aspect of the present invention uses a high operating temperature in order to obtain a high production rate. A catalyst may be selected to produce a desired product at the selected optimum temperature. Increasing ratios of DEALE to chromium in the catalyst preparation leads to lower molecular weight polymer under constant reaction conditions. The amount of hydrogen added to the system is selected as set forth herein.

As mentioned above, preferred embodiments operate at an optimum temperature to maximize the production rate and/or to obtain about a target molecular weight and molecular weight distribution of the polymer. The optimum operating temperature, of course, is a relative term, as the temperature at various points in the reactor system will be different. Therefore, the optimum operating temperature may be based on a temperature in the fluidized bed, in a recycle stream (before or after the heat exchanger), etc. The optimum operating temperature can also be based on an average of preferred temperatures at various points in the system. Considerations when selecting the optimum temperature include functionality of the catalyst at a given temperature, the melting point of the polymer product, etc. In generally preferred embodiments, the optimum temperature will fall within the ranges provided above.

Computing Unit(s)

With reference to FIG. 1, a computing unit 50 may control various aspects of the reactor system, automatically and/or as directed by a user. The computing unit 50 may be a simple monitoring device that generates a process control signal based on an incoming signal from another system component or from a user. More complex computing units are also contemplated, such as computerized systems. The computing unit 50 may be coupled to other system components such as process controllers, flow meters on the various feed and outlet lines, indexers 162, gas analyzer 121, etc.

In preferred embodiments, one or more circuit modules of the computing unit 50 can be implemented and realized as an application specific integrated circuit (ASIC). Portions of the processing can also be performed in software in conjunction with appropriate circuitry and/or a host computing system.

As noted above, the flow rate of hydrogen added to the system may be dependent upon a flow rate or molar feed rate of another component, such as the monomer. The computing unit 50 may thus automatically control the feed rate of the hydrogen added to the system. In one embodiment, and as shown in FIG. 1, the computing unit 50 may be coupled a flow meter 51 on the monomer feed line 111. The computing unit receives a signal from the flow meter 51 indicative of a flow rate of monomer passing through line 111. The computing unit then calculates the appropriate volumetric, molar, etc. feed rate of the monomer feed or component thereof, calculates the proper amount of hydrogen to add to the system, and adjusts the flow rate of hydrogen via flow control valve 154, etc. as the monomer feed rate changes.

In another aspect of the present invention, the computing unit 50 may receive a flow index measurement, or derivative thereof, for the polymer exiting the system. The measurement, or derivative thereof, may be received directly from an indexer 162 or received via user input, or both. The computing unit may then compute an amount of hydrogen to add to the system based on the flow index measurement, or derivative thereof.

Similarly, the computing unit 50 may receive flow index measurements, or derivatives thereof, for the polymer exiting the system and for processed polymer. The measurement, or derivative thereof, may be received directly from an indexer 162 or received via user input, or both. The computing unit may then compute an amount of hydrogen to add to the system based on the flow index measurements, or derivatives thereof.

Products

Polyolefins that may be produced include, but are not limited to, those made from olefin monomers such as ethylene and linear or branched higher alpha-olefin monomers containing 3 to about 20 carbon atoms. Homopolymers or interpolymers of ethylene and such higher alpha-olefin monomers, with densities ranging from about 0.90 to about 0.965 may be made. Suitable higher alpha-olefin monomers include, for example, propylene, 1-butene, 1-pentene, 1-hexene, 4-methyl-1-pentene, 1-octene, and 3,5,5-trimethyl-1-hexene. Specific polyolefins that may be made according to the invention include, for example, high density polyethylene, medium density polyethylene (including ethylene-butene copolymers and ethylene-hexene copolymers) homopolyethylene, polypropylene, and the like.

Post-Reaction Processing

The post-reaction processing may include pelletizing the polymer created in the reactor system. Such pelletization processes, known in the art, include extruding the raw polymer through a narrow aperture, upon which the extruded polymer is cut into pellets. The polymer may be heated to facilitate extrusion. Prior to extrusion, additives may be added to the polymer.

In some embodiments, the polymer is processed to form extruded strands. In other embodiments, the polymer granules are compressed into a larger composite block. Those skilled in the art will appreciate that other forms of post-reaction processing may be performed.

Flow and Melt Index Measurement

The flow index is a measure of the ease of flow of the melt of a thermoplastic polymer. It is defined as the weight of polymer in grams flowing in 10 minutes through a capillary of specific diameter and length by a pressure applied via prescribed alternative gravimetric weights for alternative prescribed temperatures. The flow index is an indirect measure of molecular weight, high flow index corresponding to low molecular weight.

Related to the flow index is the melt index. The melt index is also indicative of a molecular weight of the polymer under test.

For polyethylene, the melt index ($I_2$) may be determined under ASTM D-1238, Condition FR-190/2.16. Melt flow rate ($I_5$) can be determined under ASTM D-1238, Condition FR-190/5.0. Flow index ($I_{21}$) may be determined under ASTM D-1238, Condition FR-190/21.6.

Flow and melt index tests may be conducted using a commercial indexer 162 (FIG. 1). Illustrative indexers are indexer models MP200 and MP600 from Tinius Olsen, Inc., 1065 Easton Road, PO Box 1009, Horsham, Pa. 19044-8009, USA.

Ratios between two flow index values for one material at different gravimetric weights may be used as a measure for the broadness of the molecular weight distribution.

It should be kept in mind that various steps performed in the methodology presented herein may be performed in any combination in each of the various combinations and permutations of the present invention.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Catalyst Preparation

Certain catalysts employed in the Examples, specifically those using 957HS chromium on silica support, were prepared on a commercial scale as follows. About 408.2 kg (900 pounds) of a porous silica support containing 2.5 weight percent chromium acetate, which amounts to about 0.5% Cr content (Grade Sylopol 957HS chromium on silica, produced by Davison Catalyst division of W. R. Grace and Co.) having a particle size of about 40 microns and a surface area of about 300 square meters per gram were charged to a fluidized bed heating vessel. There it was heated slowly at a rate of about 50° C. per hour under dry nitrogen up to 325° C. and held at that temperature for about 2 hours. The nitrogen stream was then replaced with a stream of dry air and the catalyst composition was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled powder was stored under nitrogen atmosphere until treated with a reducing agent as described below.

Preparation of chromium oxide catalyst on C35300MS support: About 1 kg of a porous silica support containing about 5 weight percent chromium acetate (Grade C35300MS chromium on silica, produced by PQ Corporation having a sales office in Malvern, Pa., USA), which amounts to about 1 weight percent Cr content, having a particle size of about 90 microns and a surface area of about 500 square meters per gram was charged to a fluidized bed heating vessel. There it was heated slowly at a rate of about 50° C. per hour under dry nitrogen up to 200° C. and held at that temperature for about 4 hours. Next it was heated slowly at a rate of about 50° C. per hour under dry nitrogen up to 450° C. and held at that temperature for about 2 hours. The nitrogen stream was then replaced with a stream of dry air and the catalyst composition was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled powder was stored under nitrogen atmosphere until treated with a reducing agent as described below.

Catalyst A is made on 957HS and Catalyst B is made on C35300MS. The activated material prepared above was placed in a vertical catalyst blender with a helical ribbon agitator under an inert atmosphere. Degassed and dried hexane or isopentane solvent was added to adequately suspend the supported catalyst. About 7.1 liters of solvent were charged per kilogram of support (0.89 gallons per pound). DEALE, available from Akzo Nobel having a sales office in Chicago, Ill., USA, and obtained as a 25 wt % solution in isopentane or hexane, was then added to the surface of the catalyst slurry over a 40 minute period to obtain a selected amount of DEALE. The mixture was agitated at a selected agitation rate at a temperature of approximately 45° C. during the selected addition time. The mixture was further agitated at a controlled rate for about 2 hours. Then the solvent was substantially removed by drying at a jacket temperature of approximately 70° C. and slightly above atmospheric pressure for about 14 to 18 hours. The resulting dry, free flowing powder was then stored under nitrogen until used. Information about the catalysts produced by this method is found in U.S. Pat. No. 6,989,344.

General Polymerization Procedure

Examples were conducted continuously in a 14 inch diameter fluidized-bed reactor. Cycle gas was circulated through the reactor and heat of reaction was removed in a heat exchanger. Catalyst powder was continuously introduced into the fluidized bed. Monomers, hydrogen and oxygen were fed into the cycle gas piping. Product was transferred intermittently into a product chamber, depressurized, degassed briefly, and then discharged into a drum. The drum contained butylated hydroxytoluene, an antioxidant stabilizer, as a temporary storage stabilizer, and was treated with a stream of moist nitrogen. Certain conditions in the fluidized-bed reactor were maintained at a constant value or in a narrow range. Ethylene partial pressure was about 200 psi. The $H_2/C_2$ molar gas ratio in the cycle gas was varied. Total reactor pressure was 360-390 psia. Superficial gas velocity within the fluidized bed was 1.7-2.0 ft/s. Reactions were conducted in a similar manner to that found in U.S. Pat. No. 6,989,344, which is herein incorporated by reference.

Results for examples are shown in Table 1. Details of each example are presented below.

TABLE 1

| | | Catalyst | | Process Conditions | | | | | | Product | | |
|---|---|---|---|---|---|---|---|---|---|---|---|---|
| | | | | | | | | | | Granular | Extruded | |
| Example | | Cr Loading (wt %) | DEALE (wt %) | Reactor Temp (° C.) | H2/C2 (gas mole ratio) | C6/C2 (gas mole ratio) | Oxygen (ppb) | STY (lb/hr/ft3) | Production Rate (lb/hr) | Flow Index (dg/min) | Flow Index (dg/min) | Density (g/cc) |
| 1 | A | 0.5 | 4.9 | 101.0 | 0.050 | 0.0090 | 20.2 | 7.65 | 62.7 | 18.3 | 12.2 | 0.9484 |
| 2 | A | 0.5 | 4.9 | 104.0 | 0.000 | 0.0078 | 60.1 | 8.05 | 69.8 | 11.1 | 9.8 | 0.9491 |
| 3 | B | 0.9 | 7.2 | 98.2 | 0.040 | 0.0100 | 25.1 | 8.49 | 71.5 | 12.1 | 8.6 | 0.9445 |
| 4 | B | 0.9 | 7.2 | 98.2 | 0.007 | 0.0100 | 25.1 | 8.16 | 69.6 | 7.4 | 5.9 | 0.9428 |
| 5 | B | 0.9 | 7.2 | 98.2 | 0.000 | 0.0100 | 25.1 | 8.33 | 70.0 | 5.0 | 5.1 | 0.9431 |

Figure 2:
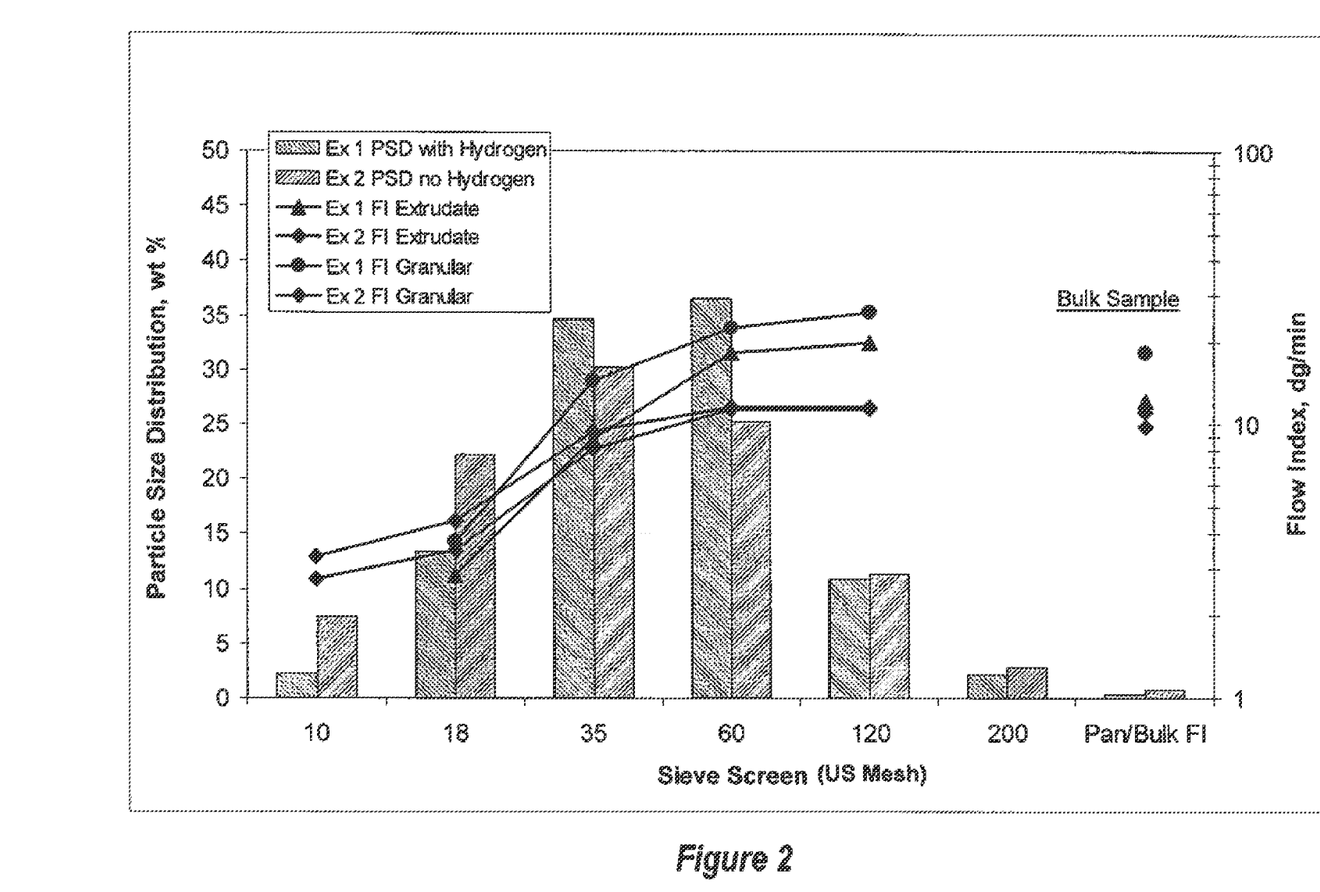
FIG. 2 is a graph of particle size distribution and flow index vs. screen size for a polymer product fabricated according to one embodiment.

Example 1 shows the flow index of polymer made with a catalyst A under a certain set of reaction conditions containing a fixed hydrogen to ethylene ratio. The particle size distribution of the polymer, and the flow index for various particle sizes is illustrated in FIG. 2. The flow index of the granular reaction product is considerably higher than for polymer that has been extruded. As shown in FIG. 2, a comparison of the granular polymer flow index with the extruded flow index of size fractionated portions of this polymer shows that all the fractions show a significant shift in flow index. It can also be seen that there is a significant variation in the flow index of the polymers versus polymer size. The larger size polymer particles have lower flow index values than that found with the smaller particles.

Example 2 shows the flow index of polymer made with a catalyst A under a certain set of reaction conditions containing no hydrogen; reactor temperature and oxygen levels have been increased to maintain product flow index. The particle size distribution of the polymer, and its flow index for various particle sizes is also illustrated in FIG. 2. In this example it can be seen that the flow index of the granular and extruded polymer are very similar. This is true for the bulk material and the size fractionated portions of polymer, as illustrated in FIG. 2. In addition the variation in the flow index of the polymer versus polymer particle size is significantly reduced, producing a more uniform polymer.

Figure 3:
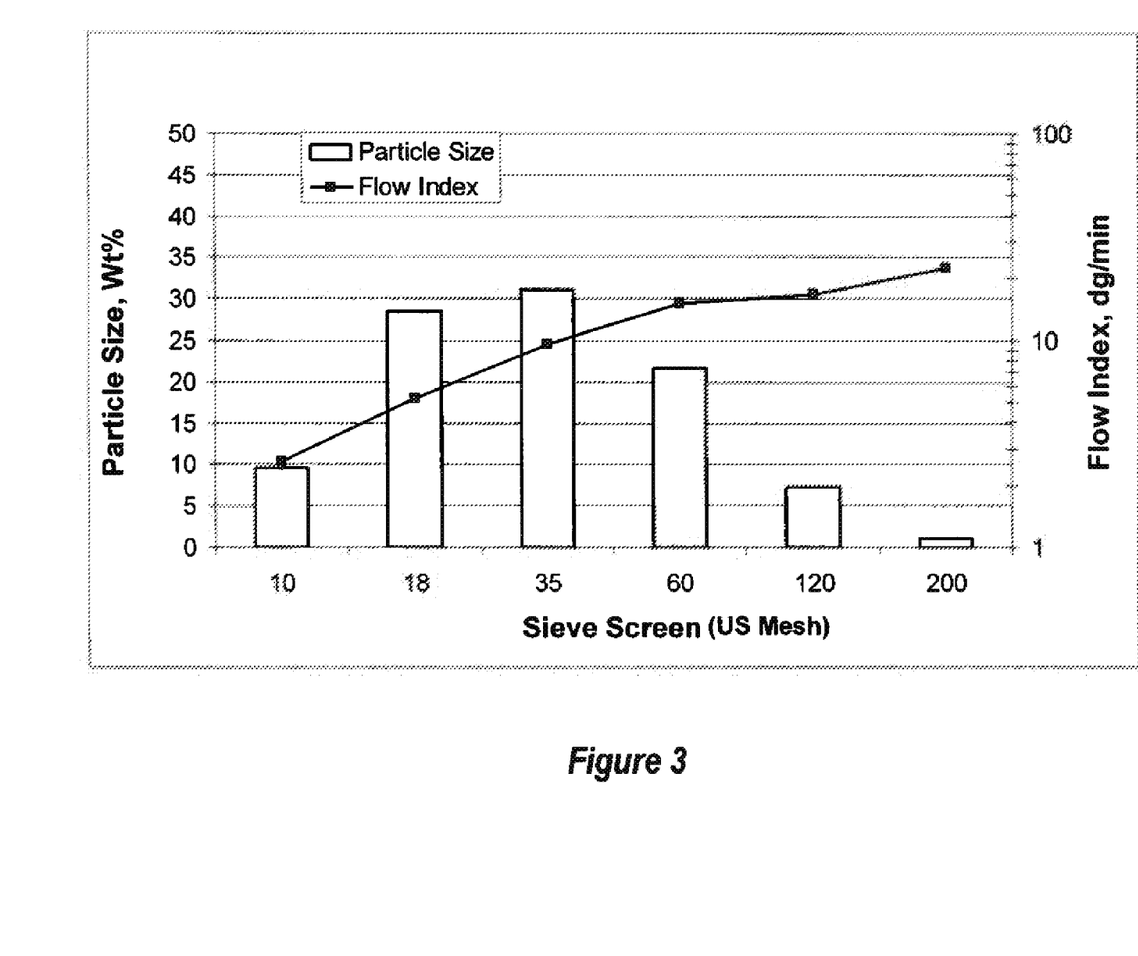
FIG. 3 is a graph of particle size distribution and flow index vs. screen size for a polymer product fabricated according to one embodiment.

Example 3 shows the flow index of polymer made with a catalyst B under a certain set of reaction conditions with a hydrogen to ethylene ratio of 0.04. The particle size distribution of the polymer and the flow index for various particle sizes is illustrated in FIG. 3. The flow index of the granular reaction product is considerably higher compared to polymer that has been extruded. It can also be seen that there is a significant variation in the flow index of the polymers versus polymer particle size. The larger size polymer particles have lower flow index values than that found with the smaller particles.

Figure 4:
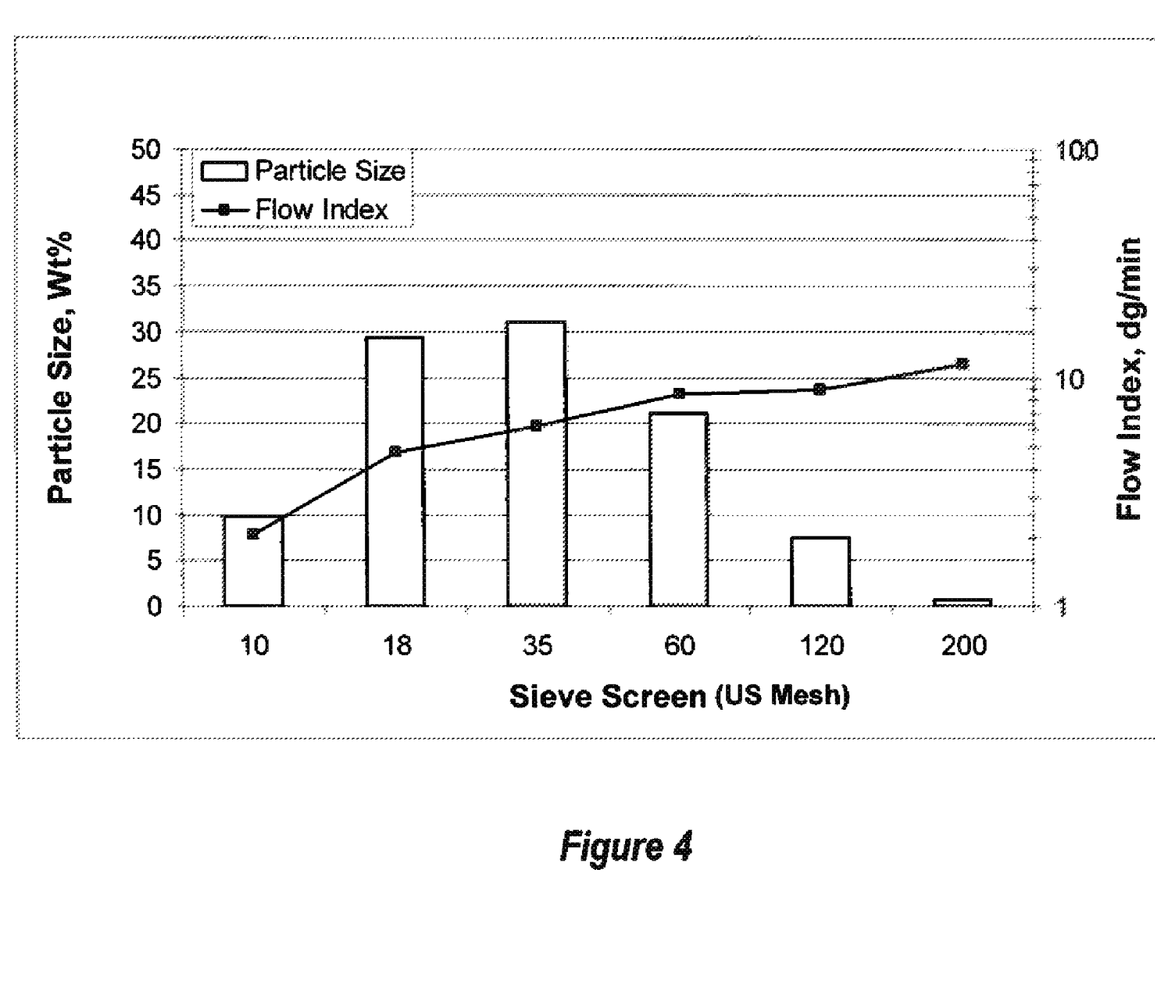
FIG. 4 is a graph of particle size distribution and flow index vs. screen size for a polymer product fabricated according to one embodiment.

Example 4 shows the flow index of polymer made with a catalyst B under a certain set of reaction conditions containing a lower hydrogen to ethylene ratio of 0.007. The particle size distribution of the polymer, and its flow index for various particle sizes is illustrated in FIG. 4. The flow index of the granular reaction product is now only slightly higher compared to polymer that has been extruded. It can also be seen that the variation in the flow index of the polymers versus polymer particle size is reduced, as shown in FIG. 4.

Figure 5:
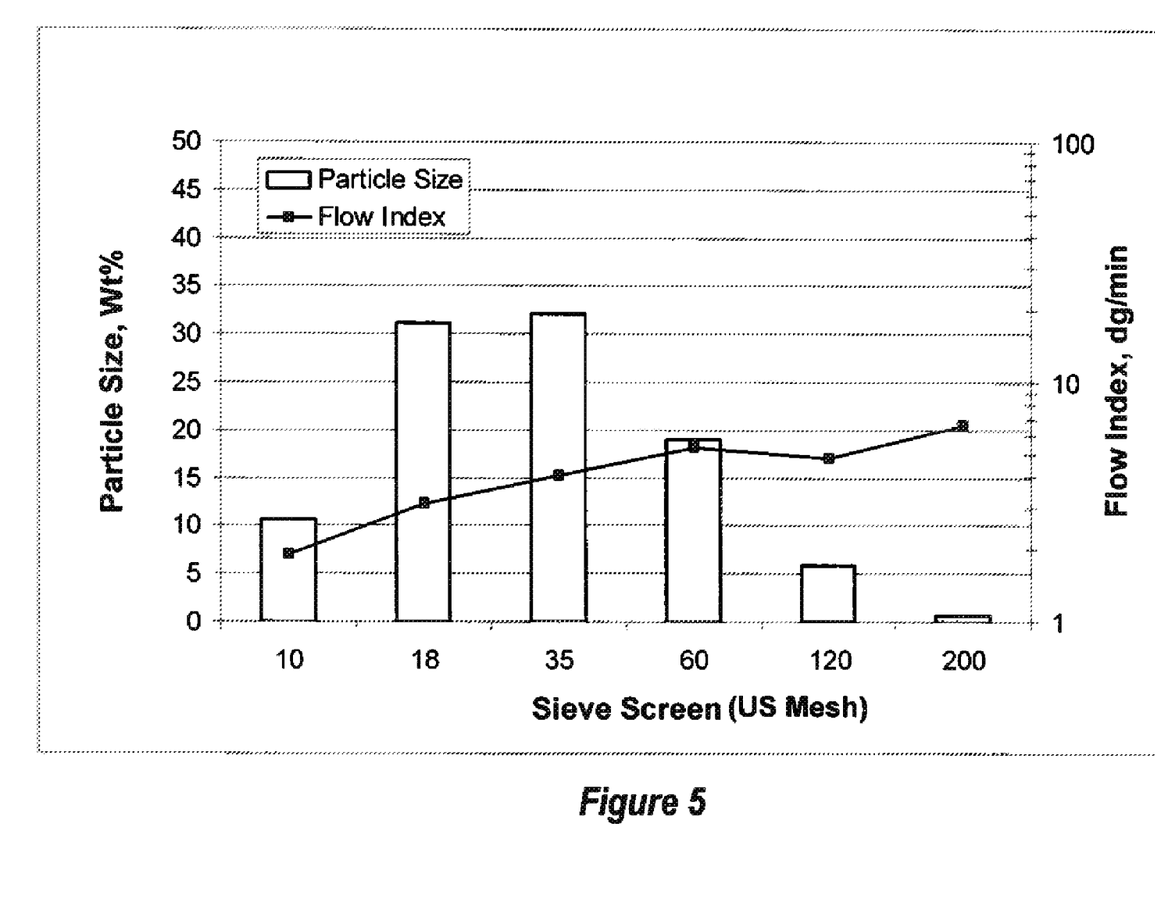
FIG. 5 is a graph of particle size distribution and flow index vs. screen size for a polymer product fabricated according to one embodiment.

Example 5 shows the flow index of polymer made with a catalyst B under a certain set of reaction conditions containing no hydrogen. The particle size distribution of the polymer, and the flow index for various particle sizes is illustrated in FIG. 5. The flow index of the granular reaction product is now about the same compared to polymer that has been extruded. The shift between the polymer granular and extruded flow index values has been virtually eliminated. It can also be seen that the variation in the flow index of the polymers versus polymer particle size is reduced even further, as shown in FIG. 5.

These results show that through the choice of hydrogen/ethylene ratios it is possible to control the shift seen in flow index values between granular and extruded polymer. The polymer flow index versus polymer particle size can also be controlled.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for producing a polymer comprising:
   introducing a chromium-based catalyst to a gas phase reactor system;
   introducing hydrogen to the reactor system;
   contacting a gaseous monomer with the catalyst in the reactor system to form a polymer;
   extracting polymer from the reactor system, wherein the extracted polymer has a first flow index;
   processing the extracted polymer, wherein the processed polymer has a second flow index; and
   determining the flow index shift, wherein the flow index shift is the difference between the second flow index and the first flow index;
   wherein the amount of hydrogen introduced into the reactor system is adjusted to manipulate the flow index shift.

2. The method according to claim 1, wherein the chromium-based catalyst is a chromium oxide-based catalyst that has been reduced with diethylaluminum ethoxide (DEALE).

3. The method according to claim 1, wherein the hydrogen is added at a rate that maintains the flow index shift equal to about zero.

4. The method according to claim 1, wherein the hydrogen is added at a rate that maintains a positive flow index shift.

5. The method according to claim 1, wherein the hydrogen is added at a rate that maintains a negative flow index shift.

6. The method according to claim 1, wherein processing the extracted polymer includes pelletizing the extracted polymer.

7. The method according to claim 1, wherein the hydrogen is introduced to the reactor system at a rate sufficient to maintain in the reactor system a molar ratio of hydrogen to monomer in the range of zero to 0.5 mol/mol.

8. The method according to claim 1, wherein the hydrogen is introduced to the reactor system at a rate sufficient to maintain in the reactor system a molar ratio of hydrogen to monomer in the range of zero to about 0.01 mol/mol.

9. The method according to claim 1, wherein the hydrogen is introduced to the reactor system at a rate sufficient to maintain in the reactor system a molar ratio of hydrogen to monomer in the range of 0.0001 to 0.01 mol/mol.

10. The method according to claim 1, further comprising contacting one or more comonomers with the catalyst in the reactor system.

11. The method according to claim 1, wherein the hydrogen is added to the reactor system at a rate such that the flow index shift is less than about 2 dg/min.

12. A method for producing a polymer, comprising:
    selecting a chromium oxide based catalyst that has been reduced with diethyl aluminum ethoxide (DEALE) that produces a polymer product having about a desired product flow index at selected reaction conditions;
    adding the catalyst to a polymerization system;
    adding hydrogen and ethylene to the polymerization system at a hydrogen/ethylene gas mole ratio of about 0.01 or less; and
    contacting the ethylene with the catalyst for producing a granular polymer having about a same flow index as a pelletized polymer formed from the granular polymer.

13. The method according to claim 12, further comprising controlling the hydrogen/ethylene gas mole ratio to be in a range of about 0.0001 to about 0.01.

14. The method according to claim 12, further comprising using oxygen addition to manipulate the flow index of the granular polymer to a desired range while maintaining the hydrogen/ethylene gas mole ratio in a range of about 0 to about 0.01.

15. The method according to claim 12, further comprising selecting a reaction temperature that achieves about a maximum polymer production rate for the polymerization system, and operating the polymerization system at about the selected reaction temperature.

16. A polymerization reactor system, comprising:
   a reactor vessel;
   a mechanism for adding a chromium-based catalyst to the reactor vessel;
   a mechanism for adding a monomer to the reactor system, the monomer contacting the catalyst in the reactor system and forming a polymer;
   a mechanism for extracting the polymer from the reactor system, the extracted polymer having a first flow index, the extracted polymer having a second flow index upon further processing;
   a mechanism for adding hydrogen to the reactor system at a rate selected to have a defined effect on a flow index shift, where the flow index shift is a difference between the second flow index and the first flow index, which comprises a computing unit arranged to compute the amount of hydrogen to be added based on the first flow index and the second flow index.

* * * * *